(12) United States Patent
Valkiainen et al.

(10) Patent No.: US 8,758,936 B2
(45) Date of Patent: Jun. 24, 2014

(54) THIN FILM STRUCTURES

(75) Inventors: Matti Valkiainen, Espoo (FI); Harry Boer, Espoo (FI); Anu Koivula, Espoo (FI); Maria Smolander, Espoo (FI); Pia Qvintus-Leino, Espoo (FI); Kirsi Immonen, Espoo (FI); Liisa Viikari, Espoo (FI)

(73) Assignee: Valtion Teknillinen Tutkimuskeskus, Espoo (FI)

( * ) Notice: Subject to any disclaimer, the term of this patent is extended or adjusted under 35 U.S.C. 154(b) by 683 days.

(21) Appl. No.: 12/305,351

(22) PCT Filed: Jun. 19, 2007

(86) PCT No.: PCT/FI2007/050377
§ 371 (c)(1),
(2), (4) Date: Dec. 17, 2008

(87) PCT Pub. No.: WO2007/147947
PCT Pub. Date: Dec. 27, 2007

(65) Prior Publication Data
US 2009/0280408 A1    Nov. 12, 2009

(30) Foreign Application Priority Data

Jun. 19, 2006  (FI) ..................................... 20060602
Dec. 1, 2006   (FI) ..................................... 20061064

(51) Int. Cl.
*H01M 4/04*    (2006.01)
*H01M 4/36*    (2006.01)
*H01M 4/60*    (2006.01)
*H01M 4/62*    (2006.01)

(52) U.S. Cl.
USPC ........ 429/212; 429/215; 429/218.1; 429/232; 429/162

(58) Field of Classification Search
USPC .......... 429/421, 401, 516, 2, 212, 215, 218.1, 429/232, 162; 204/290.14, 294, 403.14; 607/2
See application file for complete search history.

(56) References Cited

U.S. PATENT DOCUMENTS

| | | | |
|---|---|---|---|
| 3,353,539 A | * | 11/1967 | Preston ............................. 607/2 |
| 2002/0001739 A1 | * | 1/2002 | Liberatore et al. ................. 429/2 |
| 2002/0025469 A1 | * | 2/2002 | Heller .............................. 429/43 |

(Continued)

FOREIGN PATENT DOCUMENTS

| DE | 19835869 | | 2/2000 | |
|---|---|---|---|---|
| EP | 1376729 | | 1/2004 | |
| WO | WO-2006/009328 | * | 1/2006 | ............... C12Q 1/00 |

OTHER PUBLICATIONS

Servat, K. et al., "Modification of porous carbon tubes with enzymes: application for biofuel cells", Journal of Applied Electochemistry, 2007, vol. 37, pp. 121-127.

*Primary Examiner* — Kenneth Douyette
(74) *Attorney, Agent, or Firm* — Birch, Stewart, Kolasch & Birch LLP

(57) ABSTRACT

A thin film structure, method of producing it and the use thereof. The thin film structure comprises a substrate with a thin conductive layer containing an oxidizing enzyme mixed with an electron transfer mediator. The thin layer is protected against wetting to allow for its storage in dry conditions and further being sufficiently porous to allow for immediate activation of the oxidizing enzyme when contacted with an aqueous solution. The thin film can be used as a cathode in electrochemical fuel cells.

33 Claims, 8 Drawing Sheets

(56) References Cited

U.S. PATENT DOCUMENTS

| | | | |
|---|---|---|---|
| 2002/0027072 A1* | 3/2002 | Cui et al. | 204/403 |
| 2005/0053825 A1* | 3/2005 | Sakai et al. | 429/43 |
| 2005/0095466 A1 | 5/2005 | Minteer et al. | |
| 2006/0003203 A1* | 1/2006 | Wang et al. | 429/21 |
| 2007/0056852 A1* | 3/2007 | Kubo et al. | 204/403.14 |

* cited by examiner

THIN FILM STRUCTURES

BACKGROUND OF THE INVENTION

This Application is the National Phase Under 35 U.S.C. §371 of PCT International Application No. PCT/FI2007/050377 which has an International filing date of Jun. 19, 2007, which claims priority to Finnish Application No. 20060602 filed on Jun. 19, 2006 and Finnish Application No. 20061064 filed on Dec. 1, 2006. The entire contents of all applications listed above are hereby incorporated by reference.

1. Field of the Invention

The present invention relates to thin films. In particular, the invention concerns thin films structures which comprise a thin layer of a conductive material deposited on a substrate. Uses of such thin film structures and methods of the production thereof are also disclosed.

2. Description of Related Art

The use of RFID (Radio Frequency Identification) technology for various applications, such as remote detection, control and identification, is constantly growing. Generally, an RFID device comprises a microchip and an antenna circuit combined into a small tag (an "RFID tag"), which can be attached to the identification object. By equipping this kind of a tag with a power supply it is possible to convert it into an active component, which is capable of measuring and storing desired data on, for example, temperature, pressure and pH. RFID tags are relatively inexpensive components and for commercial use the power supply is expected not essentially to increase the costs thereof. Further, the weight and the size of the power supply should be adapted to the size of the tag.

There is a need for reliable power supplies which are lightweight and which can be produced at reasonable costs.

SUMMARY OF THE INVENTION

The present invention addresses the above problems and aims at providing a novel kind of fuel cell. In particular, the present invention aims at providing a thin film structure which can be used for example in an electrochemical cell (or fuel cell) which comprises an anode/air-electric couple where the air-cathode is formed by a thin layer of a conductive material containing an oxidative enzyme. In the present context, a fuel cell of this kind is called a "biofuel cell".

In the present technical solution, the thin cathode layer contains an electron transfer mediator mixed with the oxidizing enzyme. Further, the thin layer is being protected against wetting to allow for its storage in dry conditions and it is sufficiently porous to allow for immediate activation of the oxidizing enzyme when contacted with an aqueous solution. "Immediate activation" means that the oxidizing enzyme will reach at least 70%, preferably at least 80 or 85%, of its maximum activity within a short delay of not more than 10 to 5 seconds. The thin layer should be porous enough to allow for an aqueous solution to wick into the layer and efficiently to wet most of the cathode layer once the fuel cell has been contacted with such an electrolyte. This contact between the electrolyte and the oxidizing enzyme in the presence of oxygen or air will activate the enzyme and give cause to an immediate generation of electric current.

The thin films can be formed by depositing on a suitable substrate a mixture formed by an oxidizing enzyme mixed with an electron transfer mediator, and by protecting the deposited thin layer against wetting.

The novel thin films can be used in electrochemical cells for producing electricity in conjunction with electronic components having an energy demand of 1 mW or less. One typical application is as a humidity sensor.

More specifically, the present thin film is mainly characterized by what is stated in the characterizing part of claim 1.

The use according to the present invention is characterized by what is stated in claims 31, 33 and 34 and the method of producing the present thin film structures by what is stated in claim 35.

Considerable advantages are obtainable by the present invention. Thus, when the present thin films form parts of electrochemical cells these can be stored in inactivated state and the electrolyte (moisture) is brought into contact with the electrodes only when the invention is taken into use. The effective lifetime of electrochemical cells containing an electrode of the present kind is about three weeks when the cell is in activated condition and the shelf life at least one year from the manufacture. The novel structures are environmentally friendly and can easily be disposed of.

The thin film can be manufactured by printing technology. Printing as a manufacturing method greatly lowers production costs and enables mass-production of cheap, single-use devices. A structure which contains a thin film structure of the present kind can therefore be produced by the techniques of printing and lamination.

It has been found that oxidative enzymes together with electron transfer mediators can be combined with conductive ink simultaneously maintaining the biological activity of the enzyme. Expression of the enzymatic activity can be enhanced by increasing the porosity of the conducting ink e.g. with the aid of carbon nanotubes. Simultaneously, the carbon nanotubes or particles of carbon in other forms or silver are used to create the sufficient conductivity of the ink. Various additives like binders, hygroscopic substances like polymers and sugars can be added to the ink in addition to the conductive pigment to enhance the stability of the enzyme.

Conductive polymers (particularly polyanilin) can also be used as the conductive matrix in the ink. In that case the oxidative enzyme itself can be used for polymerisation of aniline monomers using the electron transfer mediator as the dopant ion in the enzymatic polymerisation process. Carbon nanotubes can be used to increase the expressed enzymatic activity and electrochemical performance also in the case of conductive polymer-based inks.

The invention can be widely utilised in the production of printed biosensors and biofuel cells. Particularly, laccase containing inks can be used in biofuel cells utilising oxygen as the cathodic fuel of the cell. Laccase has got also various application possibilities as biological components of biosensors for e.g. phenolic compounds.

The invention can also be used in applications with (RFID) Tags capable of measuring and storing data. Also printed electronics are possible uses, e.g. electronic on cereal packings and/or for amusement purposes.

Next, the invention will be examined more closely with the aid of a detailed description and a number of working examples.

DESCRIPTION OF PREFERRED EMBODIMENTS

Figure 1:
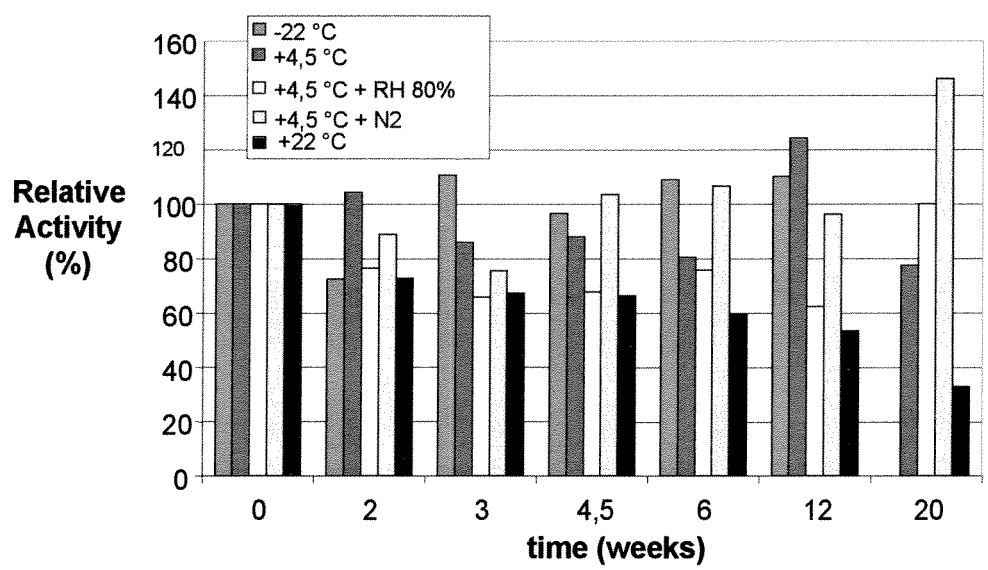
FIG. 1 shows the relative laccase activity in the prints as a function of storage time at different conditions.

According to one aspect, in a biofuel cell structure having the traditional structure comprising an anode and a cathode which is spaced apart from the anode, the cathode, which comprises a substrate with a thin conductive layer containing an oxidizing enzyme mixed with an electron transfer mediator, the thin layer is protected against wetting to allow for its storage in dry conditions and it is sufficiently porous to allow for immediate activation of the oxidizing enzyme when contacted with an aqueous solution.

According to another aspect, an oxidative enzyme together with an electron transfer mediator is combined with conductive inks based on e.g. different forms of carbon or conductive polymers simultaneously maintaining the biological activity of the enzyme. This ink is used for forming a thin, enzyme containing layer which is capable of performing as an electrode in an electric/galvanic cell. Such a layer can be stored for several months still expressing the enzymatic activity when re-moisturised and widely utilised in the production of cheap, single-use printed biosensors and biofuel cells.

According to one preferred embodiment, the thin layer of the oxidizing enzyme is formed by printing, coating or by an equivalent technique (such as spraying or film-transfer deposition) to provide a layer having an average thickness of, generally about 10 to 150 um, typically about 20 nm to 100 um.

For proper function, an electrolyte needs to be introduced into the biofuel cell so as to establish galvanic contact between the electrodes.

As stated above, we have found that the cathode layer needs to be so porous that it will be capable of wicking any aqueous electrolyte solution to as to allow for activation of the cathode. In functional terms, the porosity needs to be sufficient for the cathode to reach a level of activity, which is at least 70% of the maximum activity level within 10 seconds, preferably about 5 seconds, in particular about 2 seconds, from the point of time when the layer is contacted with water and optionally, but preferably, oxygen. At least 80%, and in particular at least 90%, of the maximum activity level is, however, generally achieved already within about 1 to 5 seconds from the time when the solution has contacted more than 50% of the cathode material.

In order further to improve the wicking of the aqueous solution, in a preferred embodiment, the thin cathode film layer is deposited on a porous substrate. Such porous substrate can be a porous fibrous web or sheet of natural or synthetic origin. On particularly preferred embodiment comprises sheets of cellulosic or lignocellulosic materials, such as conventional paper or cardboard sheets. Another embodiment comprises sheets of cellulosic or lignocellulosic fibres bonded together with synthetic resins, such as non-woven products. Also completely synthetic layers or, for example expanded polymers, can be used as well as felted layers of natural or synthetic fibres or combinations thereof, and textiles and mats.

In practice, one particular convenient working embodiment comprises filter paper. In particular filter paper of bleached or unbleached, wood-free or wood-containing fibres having a surface weight of about 40 to 90 g/m$^2$ is used. Bleached chemical fibres are particularly preferred.

For proper function, the cathodic enzyme should have a redox potential, expressed as V vs. NHE, of at least 0.3, preferably at least 0.35 and in particular 0.4.

In a biofuel cell according to the present invention, the oxidizing cathodic enzyme is preferably a peroxidase or an oxidase. Typically, the enzyme is selected from the group of laccases (EC 1.10. 3.2), catechol oxidases (EC 1.10. 3.1), tyrosinases (EC 1.14. 18.1), bilirubin oxidases (EC 1.3.3.5), peroxidase (EC 1.11. 1.7), manganase peroxidase (EC 1.11. 1.13), lignin peroxidase (EC 1.11. 1.14), cytochrome-c oxidase (1.9.3.1), L-ascorbate oxidase (1.10.3.3) and ceruloplasmin (1.16.3.1).

Preferably and typically, the oxidative enzyme is a laccase which can be selected from laccases obtainable from *Melanocarpus* (EC 1.10.3.2), from *Trametes* (EC 1.10.3.2), from *Pycnoporus* (EC 1.10.3.2), from *Rhizoctonia* (EC 1.10.3.2), from *Coprinus* (EC 1.10.3.2), from *Myceliophtora* (EC 1.10.3.2), from *Pleurotus* (EC 1.10.3.2), from *Rhus* (EC 1.10.3.2), from *Agaricus* (EC 1.10.3.2), from *Aspergillus* (EC 1.10.3.2), from *Cerrena* (EC 1.10.3.2), from *Curvularia* (EC 1.10.3.2), from *Fusarium* (EC 1.10.3.2), from *Lentinius* (EC 1.10.3.2), from *Monocillium* (EC 1.10.3.2), from *Myceliophtora* (EC 1.10.3.2), from *Neurospora* (EC 1.10.3.2), from *Penicillium* (EC 1.10.3.2), from *Phanerochaete* (EC 1.10.3.2), from *Phlebia* (EC 1.10.3.2), from *Podospora* (EC 1.10.3.2), from *Schizophyllum* (EC 1.10.3.2), from *Sporotrichum* (EC 1.10.3.2), from *Stagonospora* (EC 1.10.3.2) from *Chaetomium* (EC 1.10.3.2), from *Bacillus* (EC 1.10.3.2), from *Azospirillum* (EC 1.10.3.2) and from *Trichoderma* (EC 1.10.3.2).

The enzyme has an activity of about 1 to 100,000 nkat/g, preferably 10 to 500 nkat/g, and it is employed in an amount of 0.0001 to 10 mg protein, 0.01 to 5 mg per g of dry matter of the cathode layer.

Generally, in the present invention a mediator is used which exhibits good electrochemical properties. Such a mediator can be selected from the group consisting of ABTS [2,2'-azino-bis(3-ethylbenzothiazoline-6-sulfonic acid)], methylsyringate [methyl 3,5-dimethoxy-4-hydroxybenzoate] and other methoxy and dimethoxy phenols, and ferrocenecarboxyaldehyde and other ferrocene derivates, and mixtures thereof, although this list is by no means exhaustive.

The concentration of the mediator in the in the cathode layer can vary within a broad range. Typically, the concentration is about 0.001 to 10.0% calculated from the weight of the cathode layer.

According to a preferred embodiment, the mixture of the enzyme and the mediator further contains conductive ink. Such a conductive ink typically comprises an electrically conductive component selected from the group consisting of carbon nanotubes, metal particles, carbon particles and inherently conductive polymers and mixtures thereof and, optionally, a binder. According to one embodiment, an inherently conductive polymer forms the conductive matrix of the ink. In this case, the conductive ink is then obtainable by polymerizing the monomer corresponding to the conductive polymer in the presence of the oxidative enzyme using the mediator as a dopant for the polymer, said oxidative enzyme catalyzing the polymerization reaction.

In order to increase the enzymatic activity and porosity of the cathode layer, the conductive ink may further contain carbon nanotubes.

As discussed above, it is possible to modify the composition of the thin layer by incorporating certain components, which bring along properties of increased water absorption or moisture retention. Thus, one embodiment comprises a layer with a water-soluble polymer, such as polyvinylalcohol, as a moisture absorbing component, and the conductive ink comprises a hydroscopic substance, such as a polymeric component or a polysaccharide, for enhancing the stability of the enzyme. The moisture absorbing component is typically present at a concentration of 0.001 to 10 wt-%, in particular about 0.1 to 7.5% by weight of the dry matter of the layer. The utility of the absorption components will be examined more closely further below.

One particular interesting use of the present thin layers is as cathode in electrochemical cells.

Specific laminar structures for the cells will be shown in more detail below in connection with the working examples.

As noted above, the thin layer is protected against wetting to allow for its storage in dry conditions. There are various ways of protecting the thin layer. Conventionally, it can kept in a rigid or flexible casing having a wall and a closing mechanism which is moisture proof or, preferably, moisture and water proof. The casing can also be shaped into a pouch or envelope. Preferably, the active layer is kept dry by encapsulating the layer in a material which is impermeable to liquid water and water vapour.

The encapsulating material can be employed in the form of single- or multilayer structures. Such comprise for example at least one film or sheet or layer of a suitable polymeric material or of a metal or a combination of two or more materials, such as two or more polymeric materials or one or several polymeric materials and at least one metal, preferably in the form or a foil. The polymeric materials can used in the form of films, foils and coating layers. Any of the afore-going barrier materials can be used in combination with fibrous sheets and webs, such as paper and cardboard substrates.

Thus, as particular examples of materials suitable for the present invention, the following can be mentioned: polymer films, including PE, PP, VC-copolymers, isobutylene polymers, PVDC-copolymers, polyurethanes, PE-Vac-polymers, polyamides, PTFE, or by waxes, metals, metal foils, platey pigment particles, such as kaolin, talc and combinations and mixtures thereof. Each of these can be employed in combination with a fibrous substrate, such as paper or board. Naturally, combinations of polymeric films, metal foils and paper and board are possible.

By incorporating platey pigments into the material, the barrier properties of both polyolefinic and other thermoplastic films can be improved.

A water sealing material can also be applied on the fibrous network thus creating a composite of fibrous network and water sealing material. In this case also, the barrier properties of the water sealing material can be improved by incorporating platey pigments.

Coating of the fibrous network or a combination of the materials can be done, for example by extrusion coating, dispersion coating, laminating or other coating methods, lamination being particularly advantageous.

One preferred embodiment of the present invention comprises a laminar structure with, in the indicated order,
a first planar layer forming a current collector,
a second planar layer placed on top of the first layer, said second layer forming the anode of the cell,
a third layer which forms a porous substrate, and
a fourth layer formed on top of the porous substrate by printing, said fourth layer comprising a mixture of a phenoloxidase and a mediator.

There can be a fifth layer is placed in-between the second and the third layers, said fifth layer being capable of separating the second and the third layers and allowing for migration of charge carriers between the electrodes of the cell. Further, the fourth layer can be covered by a sixth layer which is capable of retaining moisture and which is permeable to oxygen.

In one particularly convenient embodiment (cf. FIG. 10a) the third layer and the fifth layer are formed by two portions of the same laminar sheet, which has been folded to provide two overlapping portions between the second and the fourth layers. In that structure, the first and the second layers are deposited on a first portion of the laminar sheet and the fourth and any sixth layers are deposited on the same side of the laminar sheet within a second portion forming the adjacent and opposite portion of the sheet with respect to a folding line of the laminar sheet, whereby the second and fourth layers can be brought into in juxtaposed position by folding the laminar sheet along the folding line to abut the back parts of the laminar sheet portions.

In any of the above laminates, there is optionally a seventh layer between the fourth and the sixth layer, which seventh layer is electrically conductive and permeable to oxygen. The third, and any fifth layer, is/are preferably capable of wicking moisture for activating the cathode layer.

In order to utilize the property of long shelf life, and in order to protect the laminar structure from ambient conditions, the biofuel cell is preferably fitted into a package which is impermeable to air and moisture for storing in inactivated condition.

As a result of the above, a structure is obtained, wherein the cathode layer can be activated by oxygen from the ambient air, or it can be activated by oxygen dissolved in an aqueous solution used for moisturizing the substrate of the cathode. The enzyme (e.g. laccase) based biofuel cell needs moisture in order to be able to produce current output. This phenomena can be utilised in the structure of a electrochemical humidity indicator. If no moisture or humidity is present, the output of the fuel cell is zero. When the cell is exposed to humidity/moisture, the presence of water molecules enables laccase to function. In order to be able to determine moisture of the surrounding air, moisture absorbing substances (e.g. PVA) can be added on the cathodic sensing layer of the cell.

This invention can be further developed into a system, which integrates the exposure of the sensing layer to humidity above a certain level. The integration is based on the fact, that if humidity is below certain, predetermined level, no reaction is taking place. The threshold level of the humidity sensor can be tailored by adding substances with different humidity absorbing capacities to the sensing layer.

TABLE 1

Properties of different laccases utilising O₂ as the cathodic fuel

| Enzyme | Cofactor and pH optimum | Mediators tested | Redox potential of the enzyme V vs. NHE | Specific activity |
| --- | --- | --- | --- | --- |
| Laccase from *Melanocarpus albomyces* (rMaL; EC 1.10.3.2); secreted to the culture supernatant; monomeric | 4 × Cu; pH 3.5 (ABTS) | ABTS | 0.46 | 840 nkat/mg = 50 U/mg (on ABTS, pH 4.5) |
| Laccase from the fungus *Trametes hirsuta* (ThL; EC 1.10.3.2); secreted to the culture supernatan; monomeric | 4 × Cu; pH ~3 (ABTS) | ABTS Methyl syringate Ferrocene-carboxy-aldehyde | 0.78 | 2400 nkat/mg = 140 U/mg (on ABTS, pH 4.5) |

The ink used in the present invention can have various compositions as shown in the below table:

TABLE 2

Potential, conductive ink formulations used in the printed laccase-containing layers

| Ink n:o | Name of the ink | Ink composition |
| --- | --- | --- |
| 1 | Carbon based ink | Commercial carbon-based ink (e.g. DuPont BQ231) with carbon nanotubes, mediator and enzyme mixed in the ink |
| 2 | Silver based ink | Commercial silver-based ink (e.g. DuPont BQ129) with carbon nanotubes, mediator and enzyme mixed in the ink |
| 3 | Carbon nanotube ink | Carbon nanotubes, stabilisers, mediator and enzyme mixed in ink binder |
| 4 | PANi-based ink | Aniline enzymatically polymerised in the presence of the mediator (as the counter ion) -polymerising enzyme retained in the polymer - nanotubes added to the polymerisation mixture |
| 5 | Experimental carbon based ink | Carbon black (Printex XE-2) as filler and polyvinylacetate (Vinnapas B 1,5 sp) as binder in ethylacetate solvent together with a dispersion agent |
| 6 | Zn-ink | Commercial carbon-based ink (DuPont BQ231), zinc powder mixed with the ink |

The following examples disclose in more detail the properties of the cathode, the structures of the cells and the properties thereof.

EXAMPLE 1

Storage Stability of the Printed Cathode

Laccase containing layers produced with hand coater (ink 3 in Table 2) were stored under different conditions (−22° C., +4.5° C. (dry/humid/under nitrogen) or +22° C.) and the remaining enzymatic activity based on oxygen consumption of the printed layer in aqueous solution was determined during the storage in order to evaluate the long-term storage stability of the printed layers. It was found out that considerable proportion of the activity in the carbon nanotube ink remained even after 20 weeks of storage in ambient conditions. The example indicates that fuel cells based on printed laccase cathode can be stored in dry conditions for several months before use and reactivated again in the presence of moisture during the activity measurement.

FIG. 1 shows the relative laccase activity in the prints as a function of storage time under different conditions.

EXAMPLE 2

The Tolerance of the Printed Cathode to Heat Treatment

Laccase containing layers produced with hand coater (ink 3 in Table 2) were incubated in different temperatures (+40, 50, 60 or 90° C.) for one minute and the remaining enzymatic activity based on oxygen consumption of the printed layer was determined after the treatment in order to evaluate the heat treatment stability of the printed layers. It was found that both laccases (ThL and rMaL) could tolerate the heat treatment at 60° C.; rMaL even at 90° C.

The example indicates that the printed cathode based on laccase can be used in the production of fuel cells even if heat treatments are required during the manufacturing procedure.

Figure 2A:
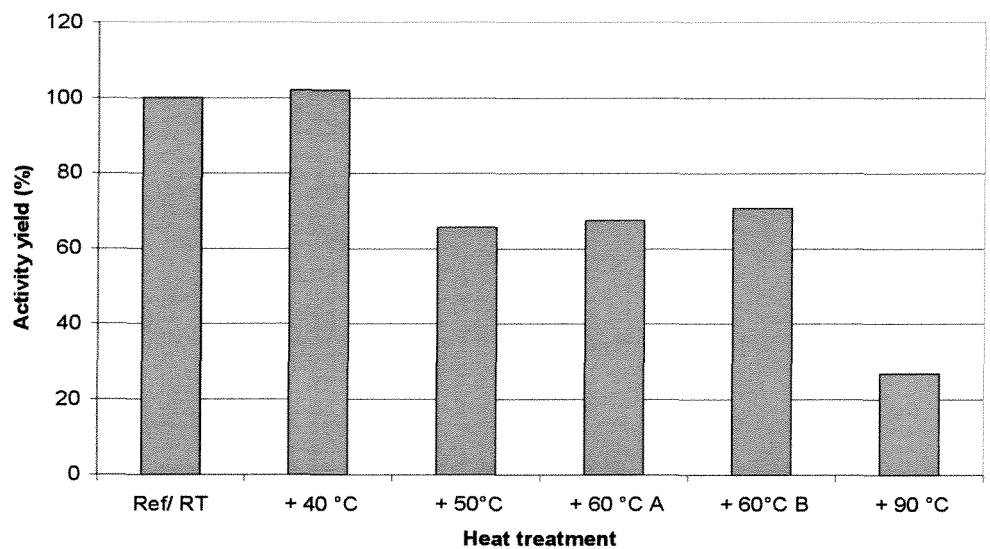
FIG. 2*a* shows the activity yield (%) of printed laccase (carbon nanotube ink (1)) after 1 minute heat-treatment at different temperatures using ThL laccase.
Figure 2B:
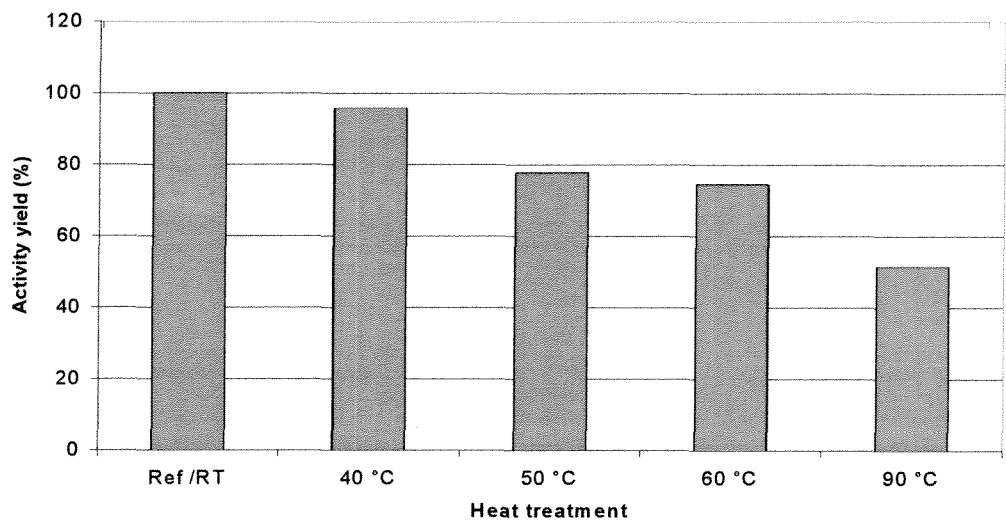
FIG. 2*b* shows the corresponding activity yield (%) using rMaL laccase.

FIGS. 2a and 2b show the activity yield (%) of printed laccase (carbon nanotube ink (1)) after 1 minute heat-treatment at different temperatures, FIG. 2a being for ThL laccase and FIG. 2b for rMaL laccase

EXAMPLE 3

Performance of Laccase-Zn Cell in Humidified Conditions

Figure 3:
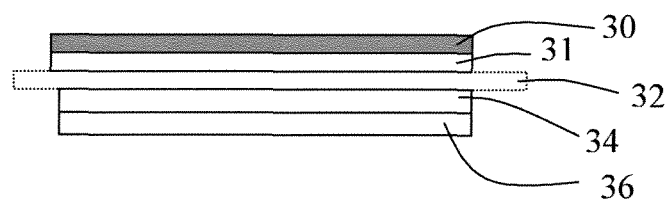
FIG. 3 shows in a side view the structure of a biofuel cell according to one embodiment of the invention.

Cell structure (FIG. 3): Layer 30 laccase-ink (Ink 1 in Table 2), filter paper 31 of print (e.g. Whatman 1), a separator 32 (e.g. Whatman 1), filter paper of print 34 (e.g. Whatman 1) and a printed Zn-anode 36 Ink 6 in Table 2).

A laccase-Zn based cell was monitored under humidified conditions using a constant flow of humidified air (100%) over the printed laccase cathode and under dry conditions using non humidified air. An Electroflex EF453 galvanostat (Szeged, Hungary) connected to a PC was used to monitor the performance of the cell The cell was sandwiched between graphite plates in modified single fuel cell hardware so that the cathode side was towards the air channels in the graphite plate. In the humidified experiments in order to keep the cathode moist, air to the cathode was led through a Nafion-tube installed in a water bath. The humidifier was constructed by Fuel Cell Technology, Inc., USA. The temperature of the water bath was kept 1-2° C. above room temperature. The cathodic side was protected with oxygen permeable, humidity impermeable film. The voltage versus time was recorded with a potentiostat and the current draw from the cell was arranged with a resistor.

Figure 4:
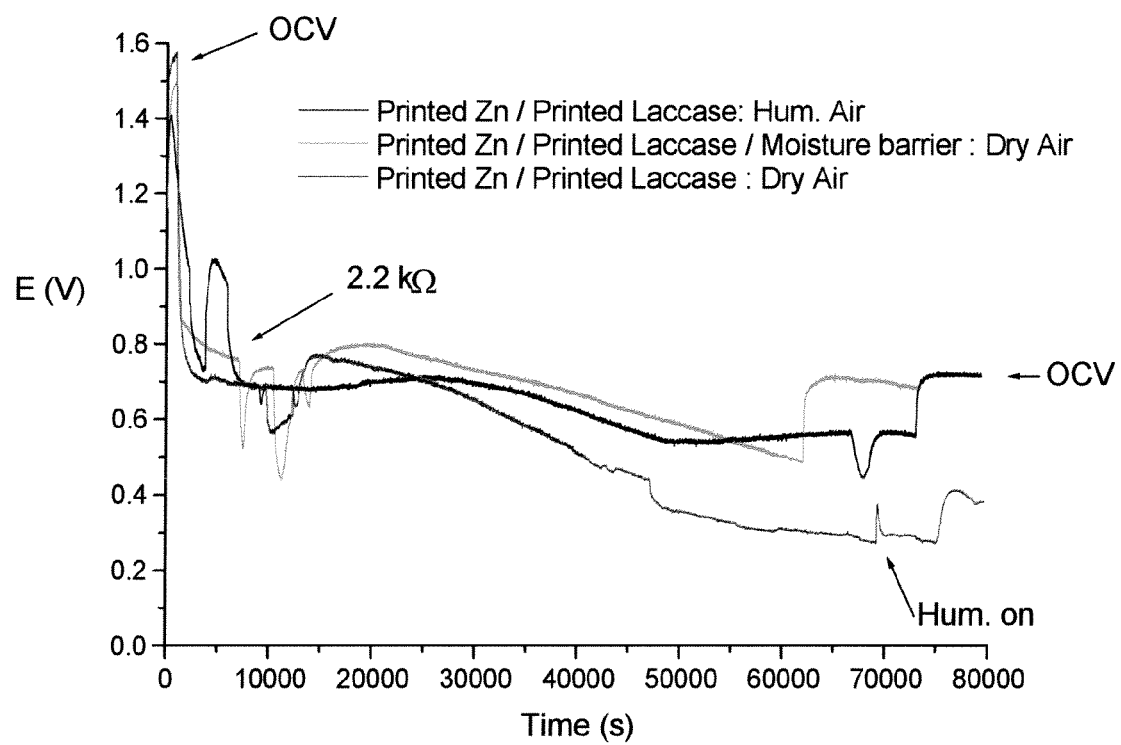
FIG. 4 indicates the performance (electrical potential) as a function of time for a cell according to the present invention having the basic structure of a printed Zn cathode/printed laccase anode in contact with humid air, provided with a moisture barrier and in contact with dry air, and without a moisture barrier and in contact with dry air.

The results of this experiment are shown in FIG. 4. An open circuit voltage (OCV) of about 1.5 V was observed, which dropped to about 0.7 V when a 2.2 kΩ load was applied.

This example demonstrates the capability of the laccase-Zn cell to produce power already when small amount of aqueous solution is added to activate the cell and the capability of the cell to function without further addition of moisture when enclosed in a film with suitable permeability properties. This last feature is further elaborated in Example 6.

EXAMPLE 4

Performance of Laccase-Zn Cell Using Different Separators

Figure 5:
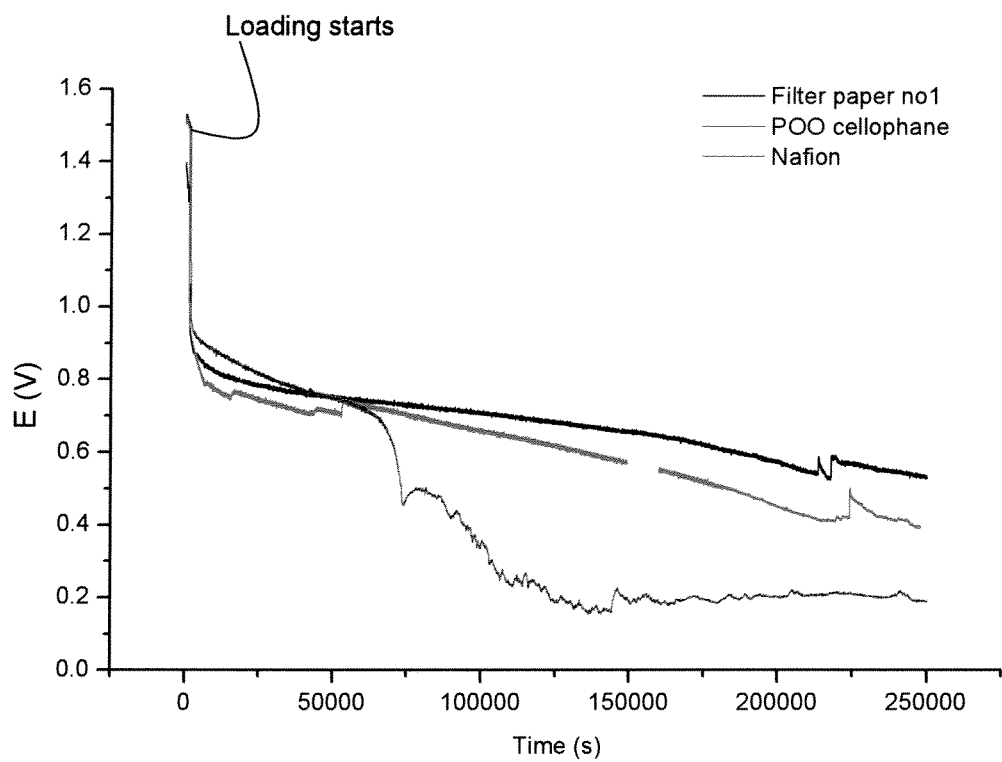
FIG. 5 shows the performance (electrical potential) as a function of time for cells comprising three different separators for the cathode.

Examples using different separators demonstrate that inexpensive separators such as filter paper and P00 cellophane can be used in the laccase-Zn cell to deliver a reasonable current density under a 2.2 kOhm load. The results are disclosed in FIG. 5.

EXAMPLE 5

Performance of Laccase PANi-Zn Cell

Figure 6:
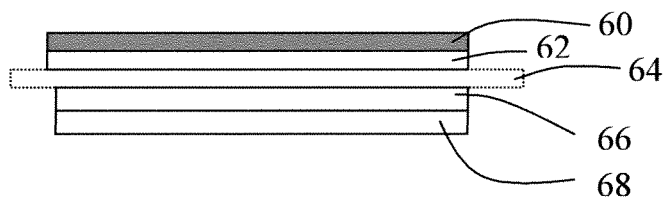
FIG. 6 shows a side view of a further cell structure.

The biocell structure comprised the following overlapping layers (FIG. 6):
Laccase PANi-ink 60 (Ink 4 in Table 2), a filter paper of print 62 (Whatman 1), a filter paper separator 64 (Whatman 1), a filter paper of print 66 (Whatman 1) and a printed Zn-anode 68. (Ink 6 in Table 2).

A laccase PANi-Zn based cell was monitored under humidified conditions using a constant flow of humidified air (100%) over the printed laccase cathode. An Electroflex EF453 galvanostat (Szeged, Hungary) connected to a PC was used to monitor the performance of the cell.

Figure 7:
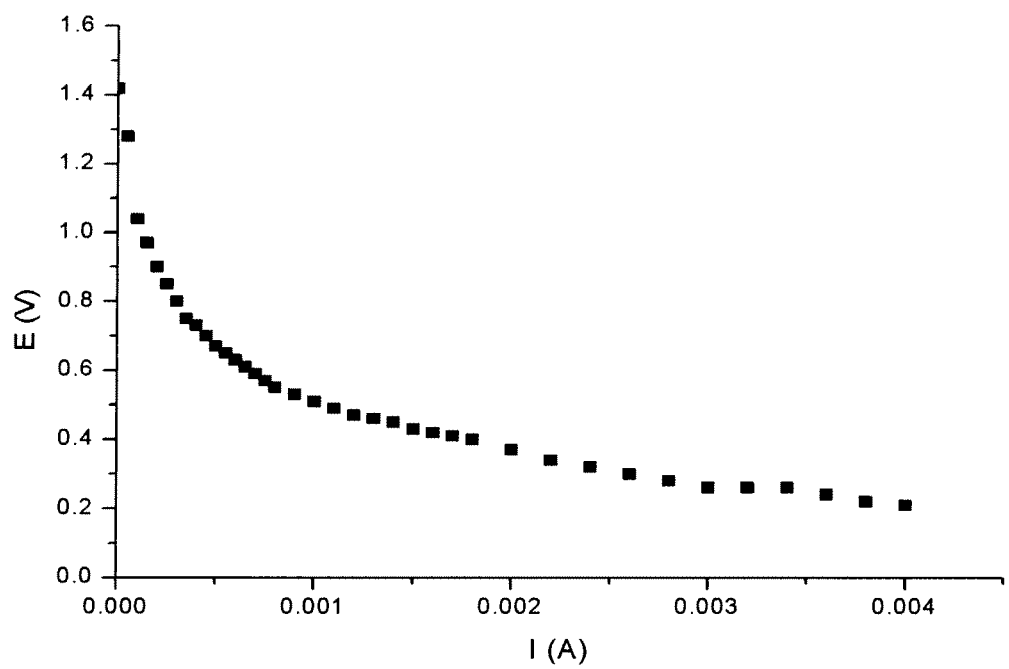
FIG. 7 indicates the performance (electrical potential) of a printed laccase PANi-Zn cell under different loads.

The cell was sandwiched between graphite plates in modified single fuel cell hardware so that the cathode side was towards the air channels in the graphite plate. In the humidified experiments in order to keep the cathode moist, air to the cathode was led through a Nafion-tube installed in a water bath. The humidifier was constructed by Fuel Cell Technology, Inc., USA. The temperature of the water bath was kept 1-2° C. above room temperature. The voltage as a function of the current drawn from the cell was recorded with a potentiostat as shown in FIG. 7.

An open circuit voltage (OCV) of about 1.4 V was observed, which dropped to about 0.7 V when a current of 0.5 mA was drawn from the cell. The example demonstrates the potential of the printed laccase PANi-Zn cell to generate a current of 0.5-1 mA at 0.7-0.5V

EXAMPLE 6

Performance of Laccase-Al Cell

Figure 8:
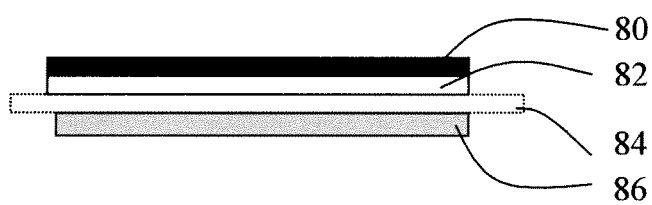
FIG. 8 shows a side view of a simplified cell structure used for the experiments of FIG. 9.

Cell structure (FIG. 8): Laccase-ink 80 (Ink 1 in Table 2), Filter paper of print 82 (Whatman 1), Capacitor paper separator 84, Al-tape 86.

Figure 9:
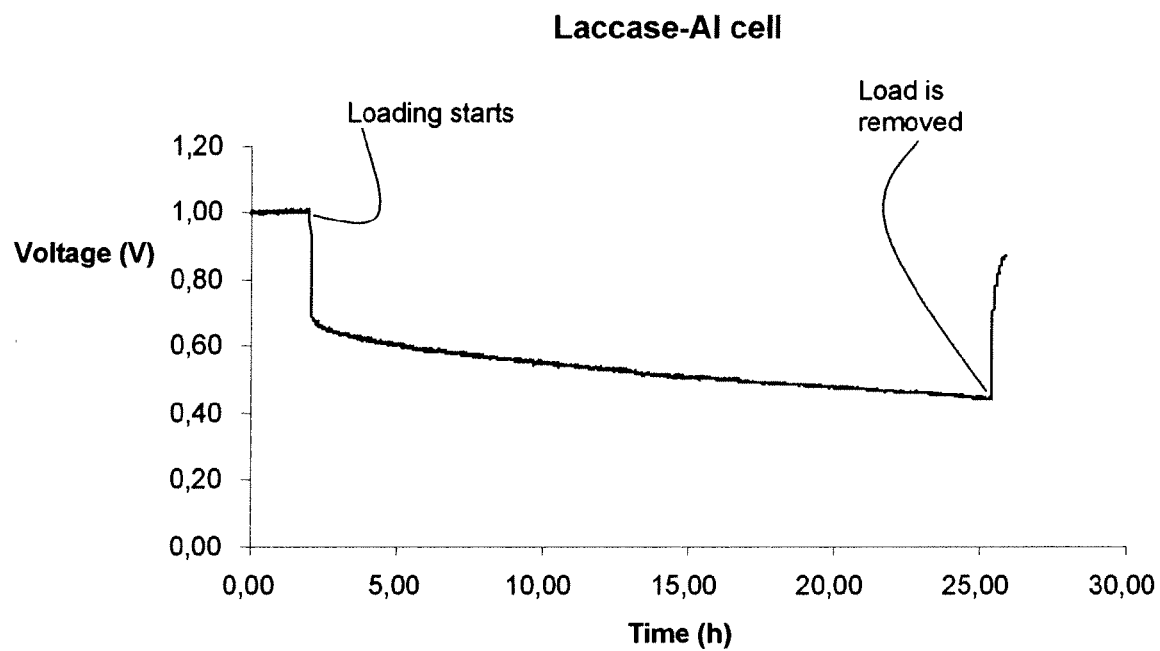
FIG. 9 depicts the performance (electrical potential) of a cell consisting of an Al-tape anode, a capacitor paper separator and a laccase print cathode at a constant load of 2.2 kohm.

The arrangement of the measurement was as in Example 4. The voltage of a cell (active area 16 cm$^2$) was monitored as a function of time under constant load 2.2 kohm, cf. FIG. 9.

This example demonstrates the capability of the laccase cathode to operate in conjugation with aluminium anode. (The anode is not optimized to give the best obtainable performance.)

EXAMPLE 7

Figure 10A:
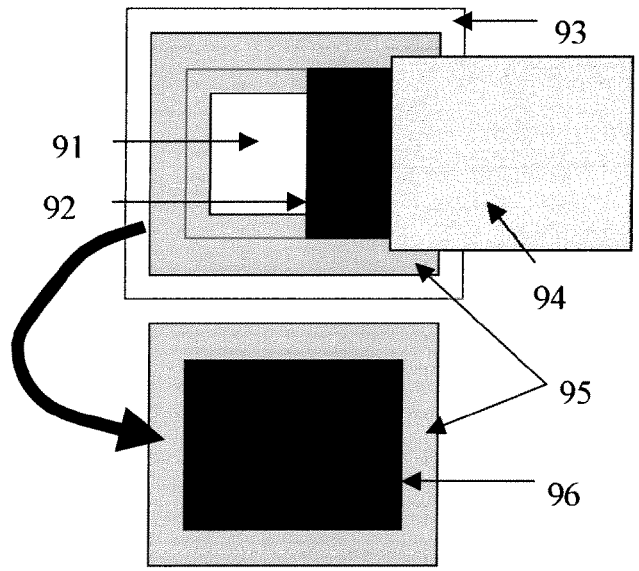
FIG. 10a shows the simplified structure of a cell enclosed in a sealing polymer film.

The Cell Functioning when Enclosed in a Film with Suitable Permeability Properties Small sealed fuel cell with Cu tape current collectors and Goretex for aeration at the cathode loaded with a 2.2 kΩ load. In FIG. 10a, the following reference signs are used:

Reference numeral 93 stands for a plastic insulator, and numerals 95 represent current collectors (e.g. copper collectors) and 91 a backwindow of permeable Goretex film. The laccase cathode is given the reference numeral 92 and the filter paper separator nr 95. The anode comprises a zinc layer 96 (Ink 6 in Table 2).

Figure 10B:
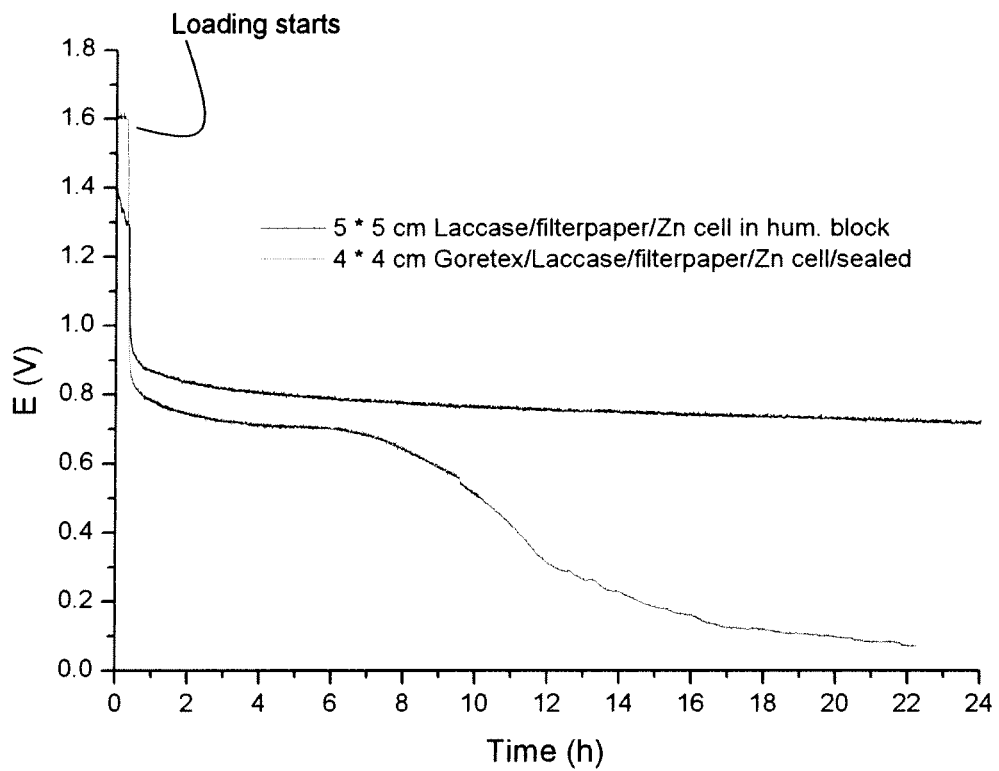
FIG. 10b indicates the performance of this embodiment compared to that of a similar cell placed at continuously humidified conditions.

The performance of this structure is shown in FIG. 10b, which indicates that it provided a quite stable potential output for several hours under load.

Figure 10C:
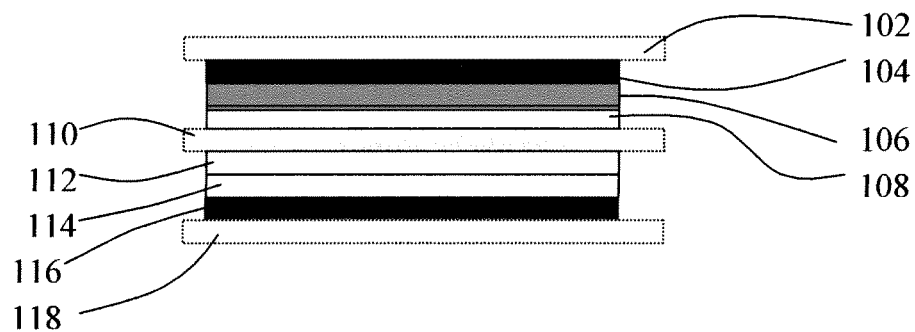
FIG. 10c shows a side view of the same cell.
Figure 11:
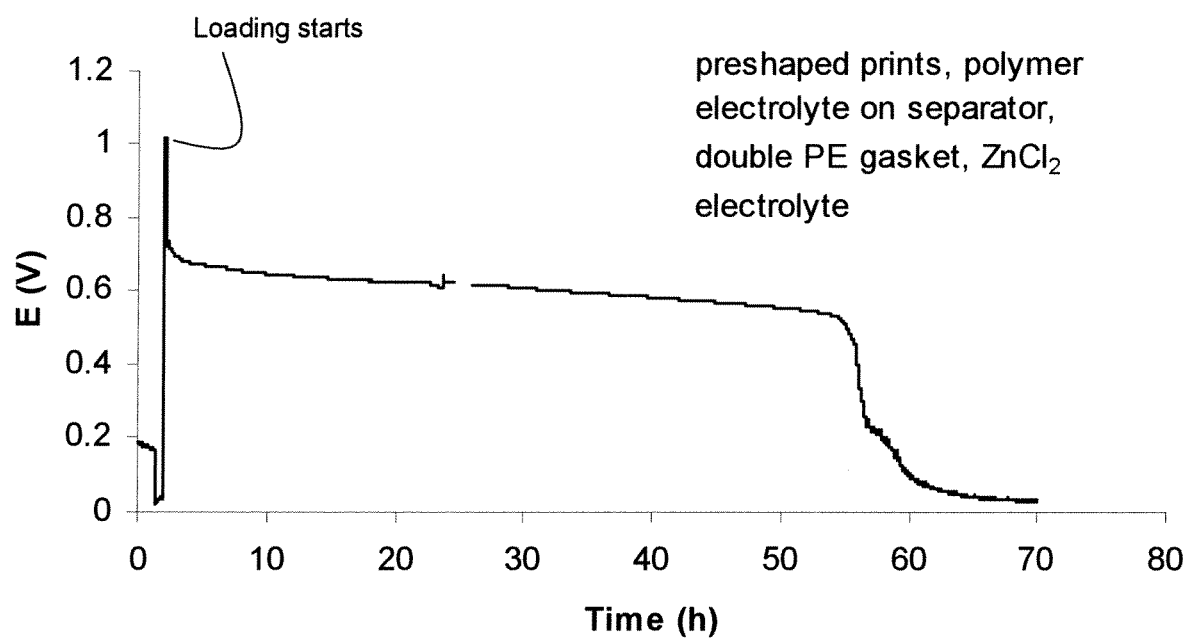
FIG. 11 shows the performance of a cell consisting of Zn-print anode, polymer electrolyte treated paper separator and laccase-print cathode measure at a constant load of 2.2 kohm.

FIG. 10c shows the specific cell laminate structure:
Cardboard with polyethylene finish 102
Current collector (Conductive print) 104
Cathode (Laccase-print) 106
Filter paper of print (Whatman 1) 108
Separator (polymer electrolyte treated paper) 110
Filter paper of print (Whatman 1) 112
Zn-print-anode 114
Current collector (Conductive print) 116
Cardboard with polyethylene finish 118

The prevention of the cell from drying and at the same time allowing oxygen transport to the cathode can be facilitated by polyethylene films and finishing as in this example.

The invention claimed is:

1. A laminar structure which comprises, in the indicated order,
    a) a first planar layer forming a current collector,
    b) a second planar layer positioned on top of the first layer, said second layer forming an anode of an electrochemical cell,
    c) a third layer which forms a porous substrate, and
    d) a fourth layer positioned on top of the porous substrate, said fourth layer comprising a printed thin conductive layer containing an oxidizing enzyme mixed with an electron transfer mediator, said thin conductive layer being protected against wetting to allow for its storage in dry conditions and further being sufficiently porous to allow for immediate activation of the oxidizing enzyme when contacted with an aqueous solution.

2. The thin film structure according to claim 1, wherein said thin conductive layer has an average thickness of about 20 nm to 100 um.

3. The thin film structure according claim 1 or 2, wherein the thin conductive layer is porous sufficient that a cathode layer will reach a level of activity, which is at least 70% of the maximum activity level within 10 seconds from the point of time when the layer is contacted with water and oxygen.

4. The thin film structure according to claim 1, wherein the substrate is porous.

5. The thin film structure according to claim 1, wherein the substrate comprises a porous substrate selected from the group consisting of porous fibrous webs and sheets of natural or synthetic origin, in particular the porous substrate is selected from cellulosic and lignocellulosic materials.

6. The thin film according to claim 4 or 5, wherein the porous substrate comprises filter paper.

7. The thin film structure according to claim 1, wherein the oxidizing enzyme is selected from the group of peroxidases and oxidases.

8. The thin film structure according to claim 7, wherein the enzyme is selected from the group of laccases (EC 1.10. 3.2), catechol oxidases (EC 1.10. 3.1), tyrosinases (EC 1.14. 18.1), bilirubin oxidases (EC 1.3. 3.5), peroxidase (EC 1.11. 1.7), manganase peroxidase (EC 1.11. 1.13), lignin peroxidase (EC 1.11. 1.14), cytochrome-c oxidase (1.9.3.1), L-ascorbate oxidase (1.10.3.3) and ceruloplasmin (1.16.3.1).

9. The thin film structure according to claim 7 or 8, wherein the enzyme has an activity of about 1 to 100,000 nkat/g, and it is employed in an amount of 0.0001 to 10 mg protein/g of dry matter of a cathode layer.

10. The thin film structure according to claim 7, wherein the enzyme has a redox potential, expressed as V vs. NHE, of at least 0.3.

11. The thin film structure according to claim 10, wherein the enzyme is Selected from laccase from *Melanocarpus* (EC 1.10.3.2), from Trametes (EC 1.10.3.2), from *Pycnoporus* (EC 1.10.3.2), from *Rhizoctonia* (EC 1.10.3.2), from *Coprinus* (EC 1.10.3.2), from *Myceliophtora* (EC 1.10.3.2), from *Pleurotus* (EC 1.10.3.2), from *Rhus* (EC 1.10.3.2), from *Agaricus* (EC 1.10.3.2), from *Aspergillus* (EC 1.10.3.2), from *Cerrena* (EC 1.10.3.2), from *Curvularia* (EC 1.10.3.2), from *Fusarium* (EC 1.10.3.2), from *Lentinius* (EC 1.10.3.2), from *Monocillium* (EC 1.10.3.2), from *Myceliophtora* (EC 1.10.3.2), from *Neurospora* (EC 1.10.3.2), from *Penicillium* (EC 1.10.3.2), from *Phanerochaete* (EC 1.10.3.2), from *Phlebia* (EC 1.10.3.2), from *Podospora* (EC 1.10.3.2), from *Schizophyllum* (EC 1.10.3.2), from *Sporotrichum* (EC 1.10.3.2), from *Stagonospora* (EC 1.10.3.2) from *Chaetomium* (EC 1.10.3.2), from *Bacillus* (EC 1.10.3.2), from *Azospirillum* (EC 1.10.3.2) and from *Trichoderma* (EC 1.10.3.2).

12. The thin film structure according to claim 1, wherein the mediator exhibits electrochemical properties.

13. The thin film structure according to claim 7 or 8, wherein the mediator is selected from the group consisting of ABTS [2,2'-azino-bis(3-ethylbenzothiazoline-6-sulfonic acid)], methylsyringate [methyl 3,5-dimethoxy-4-hydroxybenzoate] and other methoxy and dimethoxy phenols, and ferrocenecarboxyaldehyde and other ferrocene derivates, and mixtures thereof.

14. The thin film structure according to claim 1, wherein the mediator is present in a concentration of 0.001 to 10.0 wt-% of the cathode layer.

15. The thin film structure according to claim 1, wherein the mixture of the enzyme and the mediator further contains a conductive ink.

16. The thin film structure according to claim 15, wherein the conductive ink comprises an electrically conductive component selected from the group consisting of
carbon nanotubes, metal particles, carbon particles and inherently conductive polymers and mixtures thereof and, optionally, a binder.

17. The thin film structure according to claim 16, wherein an inherently conductive polymer forms the conductive matrix of the ink.

18. The thin film structure according to claim 17, wherein the conductive ink is obtainable by polymerizing the monomer corresponding to the conductive polymer in the presence of the oxidative enzyme, using the mediator as a dopant for the polymer, said oxidative enzyme catalyzing the polymerization reaction.

19. The thin film structure according to claim 17 or 18, wherein the conductive ink further contains carbon nanotubes for increasing enzymatic activity and porosity.

20. The thin film structure according to claim 1, comprising a water-soluble polymer, such as polyvinylalcohol, as a moisture absorbing component, and the conductive ink comprises a hydroscopic substance, such as a polymeric component or a polysaccharide, for enhancing the stability of the enzyme.

21. The thin film structure according to claim 20, wherein the moisture absorbing component is present at a concentration of 0.001 to 10 wt-%.

22. The thin film structure according to claim 1 forming a part of the electrochemical cell, wherein the material of the anode is selected from the group consisting of conductive metals, conductive metal alloys, biocatalysts and mixtures thereof.

23. The thin film structure according to claim 1, wherein a fifth layer is placed in-between the second and the third layers, said fifth layer being capable of separating the second and the third layers and allowing for migration of charge carriers between the electrodes of the cell.

24. The thin film structure according to claim 1 or 23, wherein the fourth layer is covered by a sixth layer which is capable of retaining moisture and which is permeable to oxygen.

25. The thin film structure according to any one of claim 1 or 23, wherein the third layer and the fifth layer are formed by two portions of the same laminar sheet, which has been folded to provide two overlapping portions between the second and the fourth layers.

26. The thin film structure according to claim 25, wherein the first and the second layers are deposited on a first portion of the laminar sheet and the fourth and any sixth layers are deposited on the same side of the laminar sheet within a second portion forming the adjacent and opposite portion of the sheet with respect to a folding line of the laminar sheet, whereby the second and fourth layers can be brought into in juxtaposed position by folding the laminar sheet along the folding line to abut the back parts of the laminar sheet portions.

27. The thin film structure according to claim 1, wherein there is a seventh layer between the fourth and the sixth layer, which seventh layer is electrically conductive and permeable to oxygen.

28. The thin film structure according to claim 1, wherein the third and optionally fifth layer is capable of wicking moisture for activating the cathode layer.

29. The thin film structure according to claim 1, wherein the thin film is produced by printing.

30. A laminar structure comprising, in the indicated order,
a first planar layer forming a current collector,
a second planar layer positioned on top of the first layer, said second layer forming the anode of an electrochemical cell,
a) a third layer which forms a porous substrate,
b) a fourth layer positioned on top of the porous substrate, said fourth layer comprising a thin conductive layer having an average thickness of about 20 nm to 100 µm comprising a mixture of a phenoloxidase and a mediator, said thin conductive layer being protected against wetting to allow for its storage in dry conditions and further being sufficiently porous to allow for immediate activation of the oxidizing enzyme when contacted with an aqueous solution, c) a fifth layer positioned in-between the second and the third layers, said fifth layer being capable of separating the second and third layers and allowing for migration of charge carriers between the electrodes of the cell, and
d) a sixth layer covering said fourth layer and being capable of retaining moisture and being permeable to oxygen.

31. The laminar structure according to claim 30, wherein the third layer and the fifth layer are formed by two portions of the same laminar sheet, which is in a folded configuration to provide two overlapping portions between the second and the fourth layers.

32. The laminar structure according to claim 31, further comprising a seventh layer positioned between the fourth and sixth layer, wherein said seventh layer is electrically conductive and permeable to oxygen.

33. The laminar structure according to claim 31, wherein the third and optionally fifth layer is capable of wicking moisture for activating the cathode layer.

* * * * *